US009064004B2

(12) United States Patent
DeRose

(10) Patent No.: US 9,064,004 B2
(45) Date of Patent: Jun. 23, 2015

(54) EXTENSIBLE SURFACE FOR CONSUMING INFORMATION EXTRACTION SERVICES

(75) Inventor: Pedro Dantas DeRose, Snoqualmie, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 399 days.

(21) Appl. No.: 13/040,939

(22) Filed: Mar. 4, 2011

(65) Prior Publication Data

US 2012/0226715 A1 Sep. 6, 2012

(51) Int. Cl.
G06F 17/30 (2006.01)
G06F 17/27 (2006.01)

(52) U.S. Cl.
CPC ........ *G06F 17/3061* (2013.01); *G06F 17/2785* (2013.01); *G06F 17/30705* (2013.01); *G06F 17/30563* (2013.01)

(58) Field of Classification Search
None
See application file for complete search history.

(56) References Cited

U.S. PATENT DOCUMENTS

| 6,732,097 | B1 * | 5/2004 | Wakefield et al. ................. 1/1 |
| 6,965,857 | B1 * | 11/2005 | Decary ............................. 704/9 |
| 7,146,356 | B2 | 12/2006 | Choi et al. |
| 7,590,647 | B2 | 9/2009 | Srinivasan et al. |
| 7,660,793 | B2 | 2/2010 | Indeck et al. |
| 7,882,055 | B2 * | 2/2011 | Estes ............................. 706/52 |
| 8,244,730 | B2 * | 8/2012 | Gupta ............................ 707/737 |
| 8,630,989 | B2 * | 1/2014 | Blohm et al. ................. 707/705 |
| 8,666,730 | B2 * | 3/2014 | Todhunter et al. ................. 704/9 |
| 2003/0208378 | A1 * | 11/2003 | Thangaraj et al. ................. 705/2 |
| 2004/0049505 | A1 * | 3/2004 | Pennock ........................... 707/5 |
| 2004/0193644 | A1 * | 9/2004 | Baker et al. ................. 707/104.1 |
| 2004/0199497 | A1 * | 10/2004 | Timmons ........................ 707/3 |
| 2005/0060324 | A1 * | 3/2005 | Johnson et al. ............... 707/100 |
| 2007/0011134 | A1 * | 1/2007 | Langseth et al. ................. 707/1 |
| 2007/0179776 | A1 * | 8/2007 | Segond et al. .................... 704/9 |
| 2007/0219989 | A1 * | 9/2007 | Faihe ............................... 707/5 |
| 2008/0059149 | A1 * | 3/2008 | Martin ............................. 704/9 |
| 2008/0097951 | A1 * | 4/2008 | Gupta et al. .................... 706/59 |
| 2009/0019032 | A1 * | 1/2009 | Bundschus et al. ............... 707/5 |
| 2009/0063536 | A1 * | 3/2009 | Naaman et al. ............... 707/102 |
| 2009/0144609 | A1 * | 6/2009 | Liang et al. ................... 715/230 |
| 2009/0157447 | A1 * | 6/2009 | Busch .............................. 705/7 |
| 2009/0228428 | A1 * | 9/2009 | Dan et al. ........................ 707/1 |
| 2010/0082331 | A1 * | 4/2010 | Brun et al. ....................... 704/9 |
| 2010/0169309 | A1 * | 7/2010 | Barrett et al. ................. 707/736 |
| 2010/0293451 | A1 * | 11/2010 | Carus ........................... 715/230 |

(Continued)

OTHER PUBLICATIONS

Unitas, "A Single View: Integrating Structured and Unstructured Data/Information within the Enterprise," Jan. 2002, http://lsdis.cs.uga.edu/GlobalInfoSys/Structured-and-Unstructured-for-EIPs.pdf.

(Continued)

*Primary Examiner* — Richard Bowen
(74) *Attorney, Agent, or Firm* — Brian Haslam; Aaron Hoff; Micky Minhas

(57) ABSTRACT

Representing structured data extracted from unstructured data in fashion allowing querying using relational database concepts. A method includes receiving user input specifying one or more database views. The method further includes receiving user input specifying an information extraction technique, such as an extraction workflow. The method further includes receiving user input specifying a corpus of data. The extraction technique is applied to the corpus of data to produce the one or more database views. These views can then be queried or operated on using database tools.

19 Claims, 2 Drawing Sheets

(56) References Cited

U.S. PATENT DOCUMENTS

| | | | | |
|---|---|---|---|---|
| 2010/0299132 | A1* | 11/2010 | Dolan et al. | 704/2 |
| 2011/0246535 | A1* | 10/2011 | Freeman et al. | 707/803 |
| 2011/0270604 | A1* | 11/2011 | Qi et al. | 704/9 |
| 2011/0295853 | A1* | 12/2011 | Li et al. | 707/736 |
| 2012/0011139 | A1* | 1/2012 | Drissi et al. | 707/760 |

OTHER PUBLICATIONS

Chu et al., "A Relational Approach to Incrementally Extracting and Querying Structure in Unstructured Data," VLDB '07, Sep. 23-28, 2007, Vienna, Austria, pp. 1045-1056, http://www.vldb.org/conf/2007/papers/research/p1045-chu.pdf.

Zhang et al., "Managing a Large Shared Bank of Unstructured Data by Using Free Table," IEEE, 2010 12th International Asia-Pacific Web Conference, pp. 441-446, 2010.

Ferrucci et al., "UIMA: An Architectural Approach to Unstructured Information Processing in the Corporate Research Environment," Journal of Natural Language Engineering 2004, pp. 1-26, https://www.fbi.h-da.de/fileadmin/personal/b.harriehausen/JIM-Project_UIMA/JNLE2004_UIMA_Paper_markedToAppear_20040122.pdf.

Gramajo et al., "Meta-data and ER Model Automatic Generation from Unstructured Information Resources," Department of Computer Engineering and Mathematics, Universitat Rovira i Virgili, Tarragona, Spain Sep. 2002.

Shea, et al., "Oracle Text Application Developer Guide", Available at least as early as Aug. 2010; Chapter 12, p. 12.1-12.6. Available at <<http://docs.oracle.com/cd/E18283_01/text.112/e16594.pdf>>.

"Oracle® Database 11g Release 2 is Now Available", Available at least as early as Sep. 1, 2009. Available at <<http://www.oracle.com/us/corporate/press/032365>>.

Lopez, et al., "Oracle: Semantic Technologies in Oracle Database 11g Release 2: Capabilities, Interfaces, Performance", Semantic Technology Conference 2010, 2010, pp. 7-9. (the month of Publication is irrelevant since the year of Publication is clearly prior to the filing of the Application) Available at <<http://download.oracle.com/otndocs/tech/semantic_web/pdf/2010_ora_semtech_capintper.pdf>>.

"Oracle Database 11g Release 2 (11.2.0.2) New Features", Available at least as early as Sep. 15, 2010, Section 2.1.1.10 ("Named Entity Extraction"). Available at <<www.itbup.net/archivernid-1348876.html>>.

* cited by examiner

EXTENSIBLE SURFACE FOR CONSUMING INFORMATION EXTRACTION SERVICES

BACKGROUND

Background and Relevant Art

Computers and computing systems have affected nearly every aspect of modern living. Computers are generally involved in work, recreation, healthcare, transportation, entertainment, household management, etc.

Computing systems are often used for information management. In particular, computing systems can be used to provide information to users. However, information may be stored and made available to users in a number of disparate ways. For example, computing systems may implement relational database management systems (RDBMSs) to store and organize data as structured data. Structured data is data that is organized semantically. Further, similar data entities are often grouped together by relationships in relational databases or by typed classes in object oriented systems. An example of a simple RDBMS is just a table with columns and rows. The columns describe categories of data while the rows store instances of the categories. RDBMS systems facilitate efficient retrieval of data. For example, a simple table may have a column for cities and a column for current temperatures. To find the temperature at a given city, the city column is identified, and the city of interest is searched for in the city column and found at a particular row in the city column. The temperature column is identified and the row corresponding to the city of interest is identified in the temperature column thus identifying the temperature at the city of interest. Thus, typically data in a RDBMS is structured data.

Another type of data is unstructured data. Unstructured data is typically not organized in a way that allows a computing system to immediately identify the type or relational structure of the data. For example, a text document may contain the following data "The temperature in Rio de Janeiro right now is 82 degrees." However, Rio de Janeiro is not structured as a city type and 82 is not structured as a temperature type, nor is there a formalized structure map for Rio de Janeiro and 82 degrees. Additionally, the text documents may contain a number of sentences describing various temperatures in various cities around the world. Determining the temperature of a given city using unstructured data in the text file may be more difficult for automated computing systems than using a structured data database where data can be searched based on categories.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein is a method practiced in a computing environment. The method includes acts for representing structured data extracted from unstructured data in fashion allowing querying using relational database concepts. The method includes receiving user input specifying one or more database views. The method further includes receiving user input specifying an information extraction technique, such as an extraction workflow. The method further includes receiving user input specifying a corpus of data. The extraction technique is applied to the corpus of data to produce the one or more database views. These views can then be queried or operated on using database tools.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments described herein may implement a user surface for representing extraction of unstructured data into structured data in an RDBMS. Some embodiments include functionality for representing extractions that operate over entire corpuses of documents represented as rowsets instead of only individual documents. Some embodiments implement functionality for exposing complex, independently queryable extraction output such as entity-relationship graphs. Some embodiments implement functionality for exposing extraction output through well-understood and well-supported RDBMS concepts such as tables, views, etc. In particular, embodiments may expose extraction results as views or schemas containing views, such that these results can represent complex structures such as graphs and are independently queryable. Some embodiments may implement interfaces and extraction methods to maintain the same feel for applying an extraction, no matter the specifics of the extraction, and thus is extensible to new extractions in a database.

Data extraction systems may be used to extract and categorize data from unstructured data to allow for automated systems to do categorized data searches on the data. These extraction systems can determine, or attempt to determine, type or relationship information, such that unstructured data can be organized into structured data.

Users increasingly use RDBMSs to store unstructured documents such as files, images, or large text values. Some methods for managing such data implement information extraction. Information extraction includes processes that input unstructured documents, then output structured data describing them. Some examples include, but are not limited to, extracting ID3 metadata from MP3 files, extracting entities and relationships from text, and recognizing faces in images or videos. Performing such extraction in the database is valuable for many reasons, such as keeping data-heavy processing near data and leveraging existing management features like backup/restore, replication, security, etc.

RDBMSs may support some built-in extraction. This falls into two main categories: indexes and special data types. For instance, fulltext and XML indexing input text, and output structured indexes. Likewise, special data types for multimedia perform extraction through functions, for example to extract color data from images.

Figure 1:
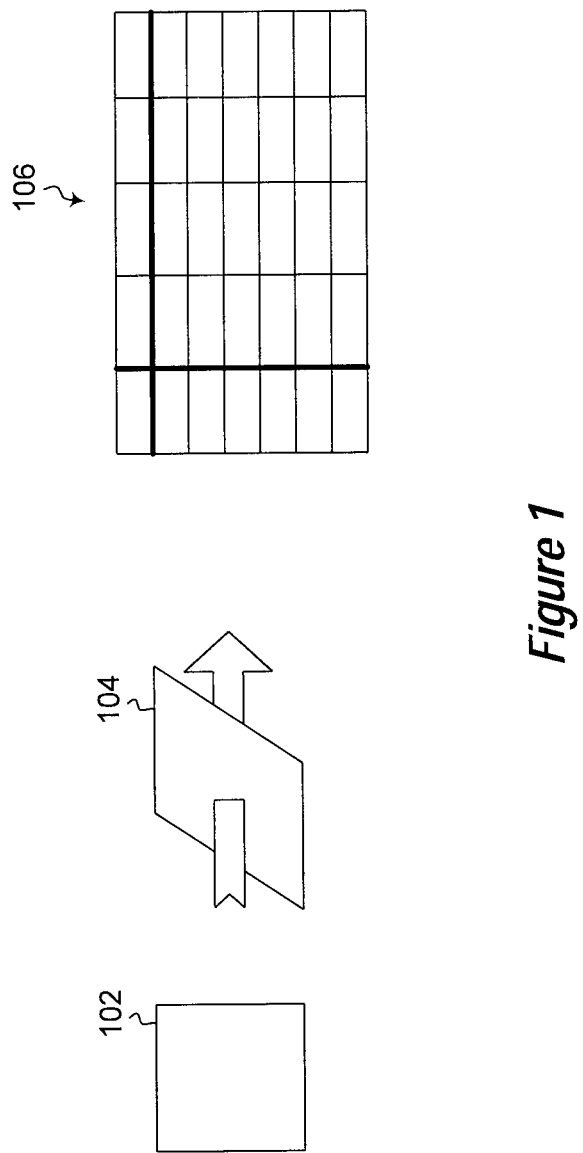
FIG. 1 illustrates processing a corpus of unstructured data through a workflow to produce one or more views.

Referring now to FIG. 1, an example is illustrated. FIG. 1 illustrates a corpus of data 102. The corpus of data 102 includes unstructured data. For example, the corpus of data 102 may include one or more unstructured text documents, media files, images, videos, biometric data, etc. The unstructured data includes data that, at an entity level, is not organized semantically in that it does not have a formalized type and/or is not in a formal entity level relationship where one entity is formally related, such as through a graph, tree and/or other relationship structure. As noted, the corpus of data can be a single file or document, or a collection of files and/or documents. In some embodiments, a single file or document may be used for ad-hoc extraction and searching as will be explained in more detail below. In other embodiments, a single file or document, or a collection of files and/or documents can be extracted to a database or other structure for on-going searching and/or access beyond a single ad-hoc instance.

The corpus of data 102 may be fed into an information extraction workflow 104. The information extraction workflow 104 defines the way that data is extracted from the corpus of data 102 to organize the data in the corpus of data 102 into structured data. Examples of information extraction workflows are now illustrated. While specific examples are illustrated, it should be appreciated that the examples are not exhaustive of extraction techniques, and other extraction techniques may be used.

In some embodiments, the extraction workflow may comprise a phrase semantic extraction technique. In particular, embodiments may include modules that are able to determine metadata about a phrase or words in a phrase based on the semantic environment of the word or phrase. For example, relationships may be determined by proximity of words to one another. For example, if the terms Microsoft and Excel are found next to each other across a corpus of documents, phrase semantic analysis can determine that these two terms are related.

Dictionary or lexical definitions may be used to create types or relationships for words or phrases. For example, a lexical definition of Rio de Janeiro would identify it as a city, and thus metadata could be extracted classifying Rio de Janeiro as a city type. In another example, a document may have the text "Jan. 13, 2011." A lexical look-up of January can be used to determine that it is a month used in determining dates, and thus, a determination can be made that this text is a date type.

In some embodiments, the extraction workflow may include relationship identification functionality. For example, a text document may contain the phrase "city of Rio Rio de Janeiro." Based on the syntax of the phrase, it can be determined that Rio de Janeiro is an object of type "city". In another example, a text document may include the text "Author: Robert Smith." Based on common syntax it can be extracted that "Robert Smith" is an object of type "author". Syntax and relationship identification can be based on user input identifying relationships and/or learning based on experience with identifying relationships. For example, user input may be received wherein a user identifies a relationship in a phrase such as by identifying the object in identifying the type. For example, in the examples illustrated above, the user may identify the word city to represent a type and Rio De Janeiro to represent an object of type city. A subsequent phrase with similar syntax could be dissected to extract metadata for creating structured data.

In some embodiments, the extraction workflow may comprise a property promotion. For example, a music file, such as an mp3 file, may include metadata in the mp3 file. Such metadata may define the artist, song title, song length, etc. This metadata can be promoted to structured data.

In some embodiments, the extraction workflow may comprise an entity recognition or entity extraction workflow. For example, a document may contain a list of company names. A workflow may be designed to identify company names as company names. This can be used to structure data in the document by either type or on a relationship basis.

In some embodiments, the extraction workflow may comprise entity disambiguation. For Example, a workflow may encounter different data in one or more documents for Pedro DeRose, and Dr. DeRose, and Mr. DeRose. The workflow may be able to determine that each of these data points represent the same person.

In some embodiments, the extraction workflow may comprise pattern recognition. One such example is illustrated in facial recognition in images. For example, in one embodiment, pattern recognition could simply note that a face appears. Alternatively or additionally, embodiments could identify the face based on a dictionary of faces.

As illustrated in FIG. 1, passing the corpus of data 102 through the extraction workflow 104 can be used to produce one or more database views 106. The database views may be ad hoc views over which a single query or single set of queries can be run, or more persistent for use over an extended period of time for an extended number or set of queries.

The views can represent one of a number of different forms of data, including tables, graphs, etc. In some embodiments, a collection of views may represent this data. For example, a schema in SQL Server available from Microsoft Corporation is an example of such a collection of views. When outputting multiple views, the extraction workflow may group them in such a collection.

In addition to the extraction technique being used to produce views, the extraction technique may further be used to produces procedures. These procedures may define methods of operating on, managing, or refreshing the content of the one or more views. The procedures may be accessible using a database system used to operate on the views.

At a high level, users can start with a table of unstructured documents. In FIG. 1, this is illustrated as the corpus of data 102. The corpus of data may, in some embodiments, include several different documents. The user specifies an extraction-related service to perform extractions, such as extracting metadata properties, extracting entities and relationships, using phrase semantics for extraction, etc. This is illustrated as an example in FIG. 1 by the extraction workflow 104. The workflow 104 represents a specific type of extraction specified by a user. The user also chooses where they want to expose the structured results. This is illustrated in FIG. 1 by the view 106.

In some embodiments, different methods of choosing and exposing an extraction may be the same, or very similar, no matter the specific extraction performed so as to create a generalized process for structuring unstructured data. In particular, a user may be able to use a standardized user interface or API to invoke different extractions.

From this high-level illustration, various intermediate concepts are further explored. The first concept is the concept of stored documents. This relates to how documents are stored in a database prior to extraction. A stored document may be a document that is a row in a table or view. The row, in this example, has a unique id, which may be part of a unique key on the table. The row may have a number of columns with text or binary, which may be equivalent to named sections of a document. A corpus of documents may be a rowset, such as a table or view.

The second concept is the concept of ad-hoc documents. This concept is directed to how documents are represented when they are not stored, but instead provided for a single query. In some example embodiments directed for use with SQL Server available from Microsoft Corporation of Redmond Wash., a SQL Server CLR type, called Document, can be used to represent a document specified as a URI. For example: DECLARE @d DOCUMENT='file:// . . . '.

A third concept is the concept of an extraction workflow. An extraction workflow defines and names a process for extracting structure from unstructured data. Some embodiments may be implemented where users can create their own extraction workflows. Some embodiments may have, additionally or alternatively, system-defined workflows. For example, the system could define a property_promotion workflow that extracts metadata from files, or an entity_relationship workflow that extracts named entities and relationships. Each workflow is a named black-box that exposes what configuration options it accepts, and what other extraction workflows should exist before it can be created. This may be exposed through system catalogs in the database.

A fourth concept is the concept of extraction invocation. Extraction invocation includes applying an extraction workflow to a particular corpus of documents. The invocation includes specifying the configuration options available for that workflow, specifying the update policy for how the extraction output should be updated when the corpus changes (e.g., automatic, manual), and an existing extraction output to build on when one is required. Thus, the invocation can be seen as the creation of the extraction pipeline that will process documents and produce output using the workflow.

In some embodiments, to represent an invocation, a clause may be used. The following illustrates an example of a clause that may be defined:

```
USING EXTRACTION extraction_workflow_name
ON document_table(document_columns)
WITH configuration_options
REFERENCES existing_extraction_output
```

The preceding illustrates a very specific example of an invocation clause that may be accepted by a system, and alternative clauses or other methods of invocation may be used. USING EXTRACTION is used to define one or more extraction workflows to operate on a corpus of data. Here, extraction_workflow_name represents a user-specified extraction workflow. ON is used to define the corpus of data. WITH is used to define various configuration options, such as a dictionary to use for dictionary-based extractions, or a set of stop-words to ignore in the input documents. REFERENCES is used to define an existing extraction output to build on. For example, an extraction workflow that identifies relationships between entities may build on the output of an earlier extraction workflow that extracted these entities. Here, REFERENCES would point to the output of this earlier extraction workflow.

Some embodiments may implement and use ad-hoc invocation. Ad-hoc invocation applies an extraction workflow to a particular ad-hoc document. However, some extractions use a corpus including multiple documents for context. For example, consider a workflow that extracts key concepts from text using statistical analysis of phrase frequencies in a corpus. Such an extraction obtains better results using a corpus including multiple documents for context to extract key phrases from each individual document. Thus, an ad-hoc extraction can specify an existing extraction output created by an extraction over an existing corpus as a basis. As with non-ad-hoc invocations, embodiments may use a variation on the above clause for ad-hoc invocations. The following illustrates a very specific variation of the above illustrated invocation.

```
USING EXTRACTION statistically_key_phrases
ON ad-hoc document
BASIS existing_extraction_output
```

In this example, key phrases would be extracted from the ad-hoc document not as an individual document, but rather as if it were part of the corpus used to produce the existing extraction output. Extraction output represents the structured output of invoking the extraction workflow on a corpus of documents. This output may be independently queryable. However, it is derived data, in the sense that it comes from applying a process over base data. In an RDBMs, the concept that represents independently queryable derived data may be a view. Thus, the output of an extraction, in some embodiments, is exposed as a view. This view can be persisted using an appropriate invocation, or used for a single ad-hoc query through an ad-hoc invocation in an ad-hoc command. For example, a WITH command is an ad-hoc command used in SQL Server available from Microsoft Corporation of Redmond Wash.

Some extractions produce output that may not be cleanly displayed as a single view. For example, consider an extraction that outputs an entity-relationship graph. One natural relational representation for such a graph is to normalize it over multiple tightly-related views. Some database systems implement collection units that can contain a plurality of views. For example, in SQL Server, a unit that can contain multiple views is referred to as a "schema", not to be confused with schema as used in other contexts defining structure and content. Thus, when an extraction outputs multiple views, it may be persisted as a collection containing those views.

What follows are a number of use case examples. Embodiments may be implemented where a user determines which types of extractions are available. For example, a database may include a user interface that allows a user to query the extractions available and the properties that should be specified for those extractions. For example, a user could submit a query that would cause the system to indicate that property promotion and phrase semantic extractions are available. For example, some embodiments include a command which allows a user to determine what extraction workflows are available. For example, in one very specific embodiment, the following command:
SELECT*FROM sys.extraction_workflows;
produces the following table output:

| extraction_work-flow_id | name | outputs_view | outputs_collection | is_global |
|---|---|---|---|---|
| 0 | Property_Promotion | 1 | 0 | 0 |
| 1 | Phrase_Semantics | 0 | 1 | 1 |

This table illustrates the extraction workflows available (Property_Promotion and Phrase_Semantics), whether or not a workflow outputs views, whether or not the workflow outputs collections of views, and whether or not a workflow is global in that the output of the extraction depends on the corpus of documents it inputs rather than each document individually.

Embodiments may include functionality for allowing a user to check the options for extraction workflows. For example, in one specific embodiment, the following command:
SELECT*FROM sys.extraction_workflow_options;
produces the following table output:

| extraction_workflow_id | option_id | name | systype_id | type_desc | enumerated_values | Default_value | is_required |
|---|---|---|---|---|---|---|---|
| 0 | 0 | DOCUMENT PROPERTY LIST | 256 | property list | NULL | NULL | 1 |
| 1 | 0 | STOPLIST | 256 | stoplist | NULL | 0 | 0 |

This table illustrates options for the extraction workflows in the preceding table.

Once extraction workflows are know, a user can specify a given workflow. The following illustrates an example of a user invoking property promotion extraction using the specific example tools illustrated above. In particular, in this example, for each document in a corpus 102, the extraction workflow 104 promote properties into columns. For example, metadata in music files may be promoted to columns entries. A user can then use database queries and properties included as part of a database to perform queries on the extracted properties.

First, a user creates a property list, for a property-scoped search. In the example illustrated, a user will change SEARCH PROPERTY LIST to DOCUMENT PROPERTY LIST. This is done with the following command:
CREATE DOCUMENT PROPERTY LIST manualProperties . . .

The user then invokes the property promotion extraction, persisting the output into a view. The following invocation, following the examples above, may be used:

```
CREATE VIEW Production.DocumentProperties
  USING EXTRACTION Property_Promotion
  ON Production.ProductManual(File TYPE COLUMN FileType)
  KEY INDEX PK_ProductManual_ProductManualID
  WITH DOCUMENT PROPERTY LIST = manualProperties;
```

In the example above, the view name will be Production_DocumentProperties, the extraction workflow used to extract data on the corpus 102 will be Property_Promotion, the extraction will be performed on Production.Product-Manual, and the extraction will be performed into the previously created manualProperties list.

As noted, once extraction has occurred extracting the data into one or more views, a database query native to the database can be used to query the view. In some embodiments, the extraction may result in one property per column, with sparse columns and a column set. As noted, once the view is created, native database operations can be performed. For example: Queries can be performed. The created view, views, or collection of views can be altered. The view and/or invocation can be dropped. Embodiments can check Metadata and/or crawl status/information. Embodiments can check which columns are input for use with the extraction use. Embodiments can check which options were set in an extraction use.

As noted, embodiments may facilitate ad-hoc invocation of extractions. The following illustrates an example of an ad-hoc property promotion extraction. In the following example, one embodiment declares an ad-hoc document, then applies the extraction to it. Applying the extraction is similar, and continues to use common relational concepts such as common table expressions.

The Property_Promotion extraction is not global, meaning that it does not need the context of the rest of the corpus to work. This is specified by is_global in sys.extraction_workflows.

```
DECLARE @D Document = 'file://...';
WITH P AS (
  USING EXTRACTION Property_Promotion
  ON @D
  WITH DOCUMENT PROPERTY LIST = manualProperties
)
SELECT * FROM P;
```

The following example illustrates invoking a phrase semantics extraction workflow. In the present example, the phrase semantics workflow outputs a collection of multiple views. In the SQL Server example, this collection of multiple views may be as a schema in SQL Server. In the present example, the collection is declared read-only because its contents are entirely controlled by the extraction invocation.

```
CREATE SCHEMA ProductSemantics AS READ ONLY
  USING EXTRACTION Phrase_Semantics
  ON Production.ProductDescription(Description LANGUAGE 'English')
  KEY INDEX PK_ProductDescription_productDescriptionID
  WITH STOPLIST = myStoplist;
```

Figure 2:
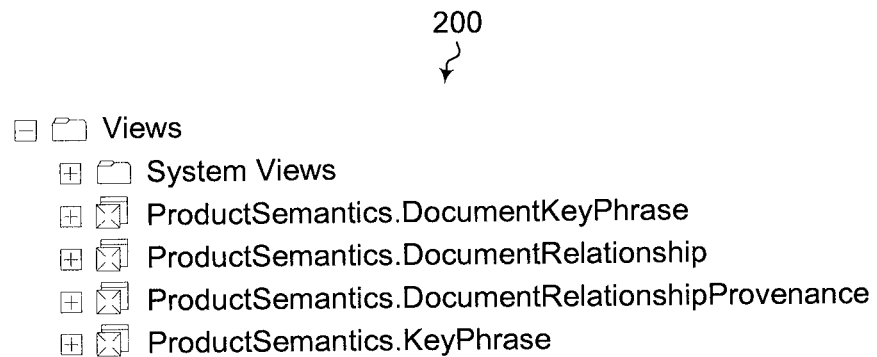
FIG. 2 illustrates a collection of views produced by an example workflow.

FIG. 2 illustrates a collection 200 created using the invocation.

The following illustrates another example where an ad-hoc invocation of a phrase semantics extraction is implemented. In the following example, an ad-hoc document is declared and then the extraction is applied to it. In this example, the ad-hoc document is represented by document_id NULL.

In the illustrated example, there are two interesting complications compared to property promotion. First, the phrase semantics extraction outputs a collection of views. To facilitate this, the clause used to create ad-hoc data in the RDBMs (e.g., the WITH clause as defined in SQL Server available from Microsoft Corporation of Redmond Wash.) can be extended to allow a transient schema, similarly to how it currently allows a transient table. Second, phrase semantics, in the present example, is a global workflow, meaning it requires the context of the rest of the corpus. This is specified above by is_global in sys.extraction_workflows. Thus, an ad-hoc invocation uses an existing non-adhoc extraction as a basis. The following illustrates an example:

```
DECLARE @D Document = 'file://...';
WITH SCHEMA S AS (
  USING EXTRACTION Phrase_Semantics
  ON @D
  BASIS ProductSemantics
)
SELECT * FROM S.KeyPhrase WHERE document_id IS NULL;
```

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 3:
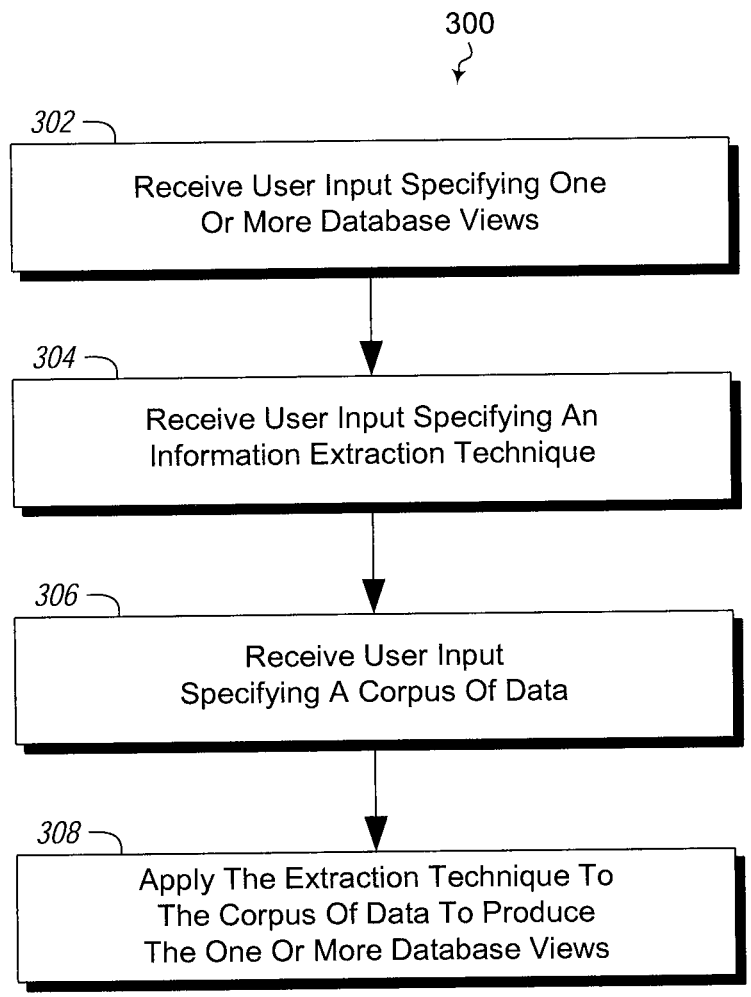
FIG. 3 illustrates a method of representing structured data extracted from unstructured data in fashion allowing querying using relational database concepts.

Referring now to FIG. 3, a method 300 is illustrated. The method 300 may be practiced in a computing environment. The method 300 includes acts for representing structured data extracted from unstructured data in fashion allowing querying using relational database concepts. The method 300 includes receiving user input specifying one or more database views (act 302). Examples of this are illustrated above where a user uses the CREATE VIEW or CREATE SCHEMA clauses illustrated above.

The method 300 further includes receiving user input specifying an information extraction technique (act 304). For example, a user can specify an extraction workflow. Examples of this are illustrated above where a user inputs a USING EXTRACTION clause.

The method 300 further includes receiving user input specifying a corpus of data (act 306). Examples of this are illustrated above by the use of the ON clauses illustrated.

The method 300 further includes applying the extraction technique to the corpus of data to produce the one or more database views (act 308). FIG. 1 illustrates applying an extraction technique (in this example, a workflow 104) to a corpus of data 102 to produce a view 106.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer. Physical computer readable storage media specifically excludes propagated signals.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method of representing structured data extracted from unstructured data in a fashion which allows querying using relational database concepts, the method comprising:
   receiving user input specifying one or more database views;
   receiving user input specifying an information extraction technique, the information extraction technique defining how to extract structured data from unstructured data and the information extraction technique comprising a phrase semantic extraction technique which determines a semantic relationship about one or more words based upon a semantic environment of the one or more words;
   receiving user input specifying a corpus of data comprising unstructured data, the unstructured data comprising data that is not organized semantically such that it does not have a formalized type and is not in a formal entity level relationship; and
   applying the extraction technique to the corpus of data to extract structured data from the unstructured data of the corpus of data and to produce the one or more database views including the extracted structured data.

2. The method of claim 1, wherein the one or more views comprises one or more ad hoc views for a single query.

3. The method of claim 1, wherein multiple views are specified as a collection of views.

4. The method of claim 1, further comprising receiving additional options related to the extraction technique.

5. The method of claim 1, further comprising performing one or more queries on the produced views.

6. The method of claim 1, wherein applying the extraction technique further produces procedures.

7. The method of claim 6, wherein the procedures define methods of operating on the one or more views.

8. The method of claim 1, wherein the extraction technique comprises a property promotion.

9. The method of claim 1, wherein the extraction technique comprises a relationship identification.

10. The method of claim 1, wherein the extraction technique comprises an entity recognition or entity extraction.

11. The method of claim 1, wherein the extraction technique comprises entity disambiguation.

12. The method of claim 1, wherein the one or more views represent a graph.

13. The method of claim 1, wherein the one or more views represent tabular data.

14. The method of claim 1, wherein the extraction technique comprises pattern recognition.

15. One or more physical computer readable storage media comprising computer executable instructions that when executed by one or more processors cause the following to be performed:
   accept user input specifying one or more database views;
   accept user input specifying an information extraction technique, the information extraction technique defining how to extract structured data from unstructured data and the information extraction technique comprising a phrase semantic extraction technique which determines a semantic relationship about one or more words based upon a semantic environment of the one or more words;
   accept user input specifying a corpus of data comprising unstructured data, the unstructured data comprising data that is not organized semantically such that it does not have a formalized type and is not in a formal entity level relationship; and
   apply the extraction technique to the corpus of data to extract structured data from the unstructured data of the corpus of data and to produce the one or more database views including the extracted structured data.

16. The one or more physical computer readable storage media of claim 15, wherein the one or more or more views comprises one or more ad hoc views for a single query.

17. The one or more physical computer readable storage media of claim 15, wherein the one or more views is a single view that is itself a collection of views.

18. The one or more physical computer readable storage media of claim 15, wherein applying the extraction technique further produces procedures.

19. A system for representing structured data extracted from unstructured data in a fashion which allows querying using relational database concepts, the system comprising one or more processors and one or more physical computer readable storage media having encoded thereon computer executable instructions which, when executed upon the one or more processors, cause the system to:
   store one or more corpuses of data, each of the one or more corpuses of data comprising unstructured data;
   receive user input specifying one or more database views;
   receive user input specifying an information extraction technique, the information extraction technique defining how to extract structured data from unstructured data and the information extraction technique comprising a phrase semantic extraction technique which determines a semantic relationship about one or more words based upon a semantic environment of the one or more words;
   receive user input specifying one or more of the stored one or more corpuses of data comprising unstructured data, the unstructured data comprising data that is not organized semantically such that it does not have a formalized type and is not in a formal entity level relationship; and
   apply the extraction technique to the specified one or more corpuses of data to extract structured data from the unstructured data of the corpuses of data and to produce the one or more database views including the extracted structured data.

* * * * *